United States Patent [19]

Peterson

[11] 4,006,296
[45] Feb. 1, 1977

[54] METHOD OF AND APPARATUS FOR TESTING A TWO DIMENSIONAL PATTERN

[75] Inventor: Christopher Ernest Peterson, Eindhoven, Netherlands

[73] Assignee: U.S. Philips Corporation, New York, N.Y.

[22] Filed: June 26, 1975

[21] Appl. No.: 590,440

[30] Foreign Application Priority Data

July 22, 1974 Netherlands .................. 7409850

[52] U.S. Cl. .................. 358/106; 178/DIG. 36; 178/DIG. 37; 356/168
[51] Int. Cl.² .................................. H04N 7/02
[58] Field of Search .......... 178/DIG. 37, DIG. 36, 178/6.8; 356/165, 168, 169; 235/92 DM, 92 QC, 92 CA

[56] References Cited

UNITED STATES PATENTS

| | | | |
|---|---|---|---|
| 3,309,958 | 3/1967 | Simon | 356/168 |
| 3,546,377 | 12/1970 | Troll | 178/DIG. 37 |
| 3,617,744 | 11/1971 | Irish | 356/168 |
| 3,823,261 | 7/1974 | Bolsey | 356/168 |
| 3,849,793 | 11/1974 | Ablett | 178/DIG. 36 |
| 3,879,133 | 4/1975 | Mathieu | 178/DIG. 36 |

*Primary Examiner*—Robert L. Richardson
*Assistant Examiner*—Michael A. Masinick
*Attorney, Agent, or Firm*—Frank R. Trifari; Bernard Franzblau

[57] ABSTRACT

A method of and apparatus for testing a two dimensional pattern uses a pair of pick-up devices for scanning a reference pattern and the pattern to be tested. The reference pattern is modified relative to the test pattern and includes three types of pattern traces, i.e. narrow black traces, narrow bright traces and intermediate wide grey traces. The pattern is tested by means of the narrow traces only thereby minimizing positioning and scanning problems.

11 Claims, 3 Drawing Figures

METHOD OF AND APPARATUS FOR TESTING A TWO DIMENSIONAL PATTERN

The invention relates to a method of testing a two-dimensional pattern by means of two synchronized pick-up devices, one for picking up the pattern to be tested and the other for picking up a reference pattern. In said method the signals produced by the two pick-up devices are compared and a difference between the signals, which corresponds to a difference between the patterns, provides an error indication. The invention also relates to an apparatus suitable for carrying out the method.

Such a method is described in U.S. Pat. No. 3,546,377. Testing is effected by comparing the profile of an object to be tested with that of a standard embodiment used as a reference. To prevent even a small, permitted difference between the pattern to be tested and the reference pattern from giving rise to an error indication, a threshold device is provided which provides a threshold value which the error must exceed. Furthermore, profile comparison requires substantially identical scanning in the scanning rasters in the two pick-up devices. In practice such a requirement of pattern registration can hardly be satisfied. Increasing the threshold value does not provide a solution because a shift of position which falls just outside the tolerance range provides an error of the same value as does a greater shift.

It is an object of the invention to provide a method and an apparatus for testing patterns in which no critical requirements of pattern registration have to be satisfied. The method according to the invention is characterized in that the reference pattern takes the form of a modified pattern comprising at least three types of pattern traces having different brightness values. The widths of two types of pattern traces, which each have one of the two extreme brightness values of the said three brightness values, are narrower than the corresponding widths in the pattern to be tested. Signal comparison for determining the pattern differences is effected only for the latter two types of pattern traces in the reference pattern.

An apparatus suitable for carrying out the method according to the invention is characterized in that the output of the pick-up device for picking-up the reference pattern is connected to two threshold circuits, one of which has a pass range for signals associated with low brightness values while the other has a pass range for signals associated with high brightness values, the said pass ranges overlapping in an intermediate range. The threshold circuits are connected to an error detector to which is also connected, via an analogue-to-binary converter, the output of the pick-up device for picking up the pattern to be tested. The error detector includes logic circuits for comparing one and the other binary values associated with the pattern to be tested with the said two extreme brightness values in the reference pattern.

The method and the apparatus according to the invention will now be described, by way of example, with reference to the accompanying diagrammatic drawings, in which.

Figure 1:
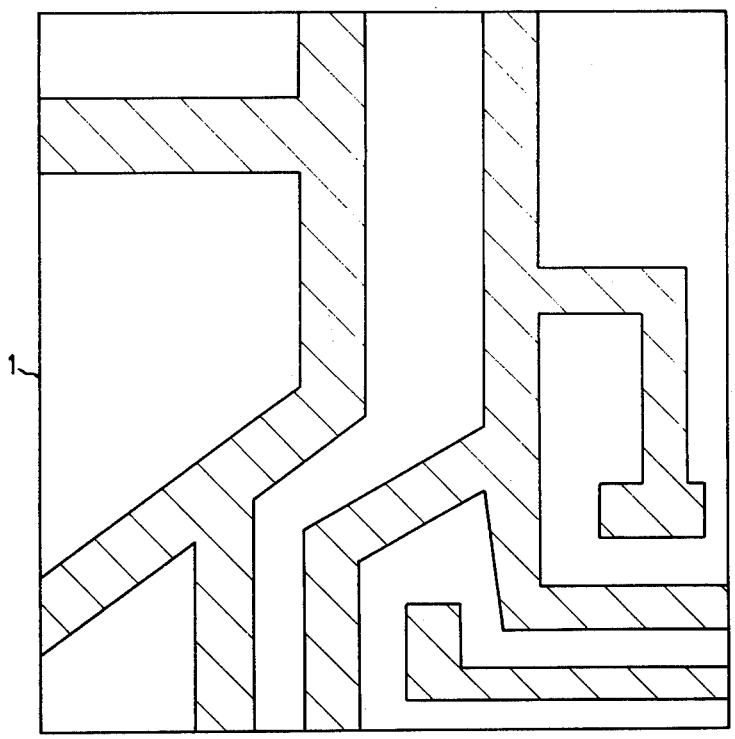
FIG. 1 shows an example of a pattern to be tested.

FIG. 1 shows a pattern 1 to be tested. The pattern 1 may, for example, be part of a printed circuit in which metal leads are provided on a support of insulating material. The pattern 1 may alternatively be part of an integrated circuit, the traces shown being layers of a semiconductor material in a semiconductor body of opposite conductivity type. The pattern 1 may also be an etched pattern on, for example, a glass plate. The exact embodiment of the pattern 1 is not specified, the only relevant point being that there are pattern traces (shaded) on a support.

Testing the pattern 1 shown in FIG. 1 implies checking that the pattern traces shown are continuous, having either inadmissible narrow stretches or portions so broadened that the separate traces approach too closely to one another. Another condition is that a prescribed specific local shape of a trace must be approximated to within reasonable tolerances.

Figure 2:
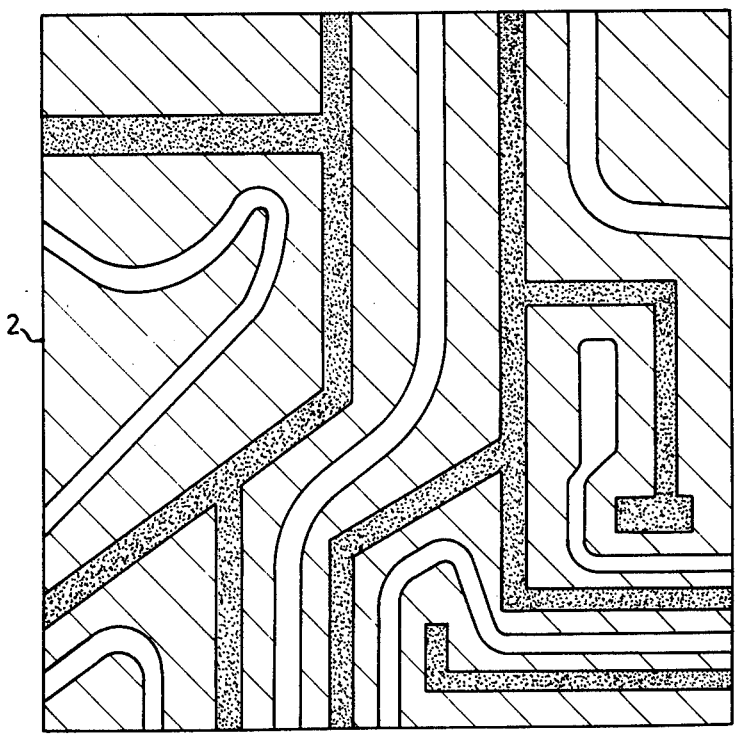
FIG. 2 shows a modified reference pattern associated with the pattern to be tested shown in FIG. 1.

The pattern 1 of FIG. 1, which may be correctly designed, is not tested with respect to a reference pattern, which in the case of correct design would be identical, but is tested with respect to a modified reference pattern 2 shown in FIG. 2. The reference pattern 2 shown in FIG. 2 comprises three types of traces, viz. narrow black traces, narrow blank traces and traces in the form of intermediate shaded areas. The pattern traces shown in the pattern 2 as black, shaded and blank have different brightness values, black corresponding to black, blank to peak white and shaded to grey on a brightness scale. The grey lies between the extreme brightness values black and peak white, for example exactly midway between them.

The black pattern traces in the reference pattern 2 of FIG. 2 correspond to the median lines of the shaded pattern traces of the pattern 1 of FIG. 1 to be tested. The width of the black pattern traces in the pattern 2 is, for example, the minimum permitted width of the traces in the pattern 1. The blank pattern traces in the reference pattern 2 are used in the tests to ascertain that the various separate traces of the pattern 1 are not interconnected but are spaced apart by a minimum distance. In the tests the shaded areas in the reference pattern 2 are not used as such, but they contain the permitted tolerances.

Figure 3:
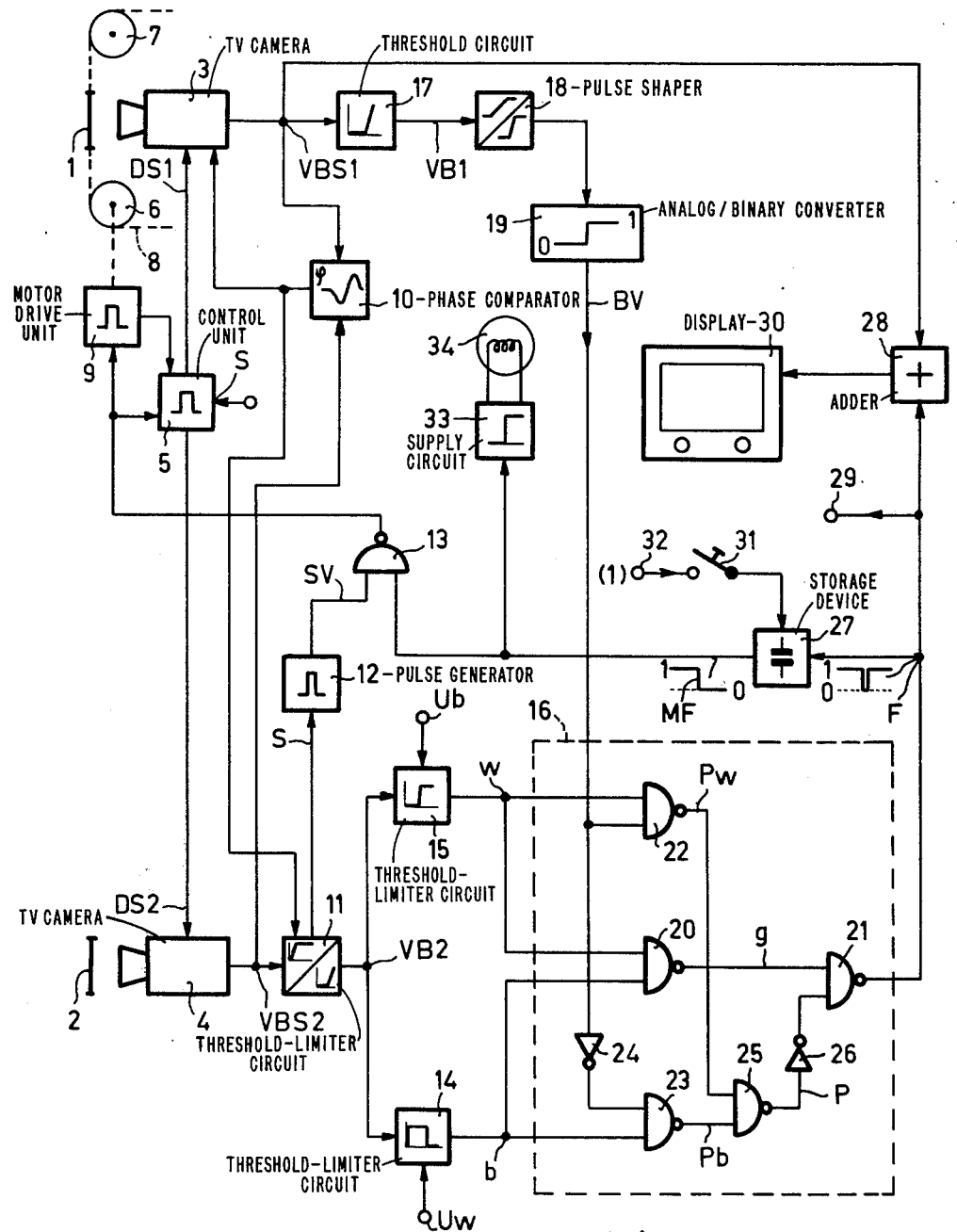
FIG. 3 shows an embodiment of an apparatus according to the invention.

The method according to the invention, using the reference pattern of FIG. 2 modified with respect to the pattern 1 of FIG. 1, will now be explained with reference to the apparatus of FIG. 3. In FIG. 3 the patterns 1 and 2 of FIGS. 1 and 2 are indicated symbolically. The pattern 1 to be tested is picked up by a pick-up device 3 which may be in the form of a television camera. In the pick-up device 3 information pick-up may be entirely electrical or partly mechanical, for example by means of moving mirrors and the like. The same applies to a pick-up device 4 which picks up the reference pattern 2. The particular construction of the pick-up devices 3 and 4 is irrelevant. The only important point is that the devices 3 and 4 each supply an electric signal which is representative of the patterns 1 and 2 respectively and on display produces a true image thereof. When conventional television cameras are used which are controlled from a control unit 5, which for this purpose supplies control and synchronizing signals DS1 and DS2, the cameras 3 and 4 each supply a video signal VBS1 and VBS2 respectively. The control unit 5 has a television synchronizing signal S supplied to it which may, for example, be a composite line and field synchronizing signal. The video signals VBS contain the video information which corresponds to the patterns 1 and 2 and blanking and synchronizing pulses so that for display the signals may be applied directly to a display device.

For pick-up the reference pattern 2 is placed in front of the camera 4 while the pattern 1 to be tested, as one from many, is placed in front of the camera 3 for a given time. In FIG. 3 the pattern 1 is moved to a position in front of the camera 3 by way of two drums 6 and 7 and a conveyor belt 8. The drum 6 is driven by a driving unit 9 which contains an electric motor. The driving unit 9 and the control unit 5 are controlled in a manner which will be described hereinafter, and the driving unit 9 is connected to the control unit 5 to indicate that the pattern 1 to be tested is correctly positioned in front of the camera 3.

Mechanical positioning of the pattern 1 in front of the camera 3 will hardly ever be so accurate that without further steps, on display of the signals VBS1 and VBS2, the patterns are in true register. Hence the signals VBS1 and VBS2 are supplied to a phase comparison circuit 10. The output of the phase comparison circuit 10 is connected to the camera 3 and this causes a pick-up shift when picking up the pattern 1, until there is coincidence between the signals VBS1 and VBS2, which on display would correspond to the patterns being in exact correspondence. With correct signal coincidence, the output of the phase comparison circuit 10 enables a threshold and limiter circuit 11 which is connected to the output of the pick-up device 4. As a result, after mechanical positioning of the pattern 1 in front of the pick-up device 3, electronic positioning is effected, after which, via the circuit 11, testing can commence.

The circuit 11 divides the signal VBS2 into a signal VB2, which comprises video information and intermediate blanking intervals, and the synchronizing signal S. The synchornizing signal S is applied to a pulse generator 12 which, for every pair of interlaced television fields, supplies a pulse-shaped frame synchronizing signal SV to an input of a NAND gate 13. The signal VB2 is applied to two threshold-limiter circuits 14 and 15. The threshold circuit 14 has a pass range for signals associated with low brightness values up to a threshold value Uw applied to the circuit, in which pass range the threshold circuit 14 carries a given high signal level. The threshold circuit 15 has a pass range for signals associated with high brightness values beyond a threshold value Ub applied to the circuit. Because the threshold value Ub is lower than the threshold value Uw, there is an overlapping intermediate range in which both circuits 14 and 15 allow the signals VB2 having a high signal level to pass. The threshold limiter circuits 14 and 15 allow the video signal VB2 to pass as binary signals b and w respectively. For the binary signals b and w and for further binary signals to be described hereinafter the condition applies that the high signal level corresponds to a logical 1 and the low signal level to a logical 0.

The signals b and w are applied to an error detector 16. The output of the pick-up device 3 is connected to the error detector 16 via a series combination of a threshold circuit 17, by which a signal VB1 is derived from the signal VBS1, a circuit 18 for improving the edge steepnesses in the signal VB1, and an analogue-to-binary converter 19 which supplies a binary video signal BV. The error detector 16 determines whether in the case of a logical 1 in the signal b (i.e. black in the signal VB2) or in the signal w (i.e. peak white in the signal VB2) logical 0 (equals black) or logical 1 (equals white) occurs in the binary signal BV. If this is the case, there is no difference between the pattern 1 to be tested and the reference pattern 2. If, however, in the case of logical 1 in the signal b or w the corresponding logical 0 and 1 does not occur in the signal BV, there is a difference which then is detected as an error.

FIG. 3 shows a possible embodiment of the error detector 16. The signals b and w are supplied to inputs of a NAND gate 20. At the output of the gate 20 a signal g appears for which the condition holds that it contains logical 0 for brightness values situated in the said intermediate range in the case of logical 1 in both signals b and w. The output of the gate 20 is connected to one input of a NAND gate 21. The signal w is also applied to one input of a NAND gate 22, to the other input of which the signal BV is applied. The signal b is also applied to one input of a NAND gate 23 to the other input of which the signal BV is applied via a signal inverter 24. The outputs of the gates 22 and 23, which carry signals Pw and Pb respectively, are each connected to an input of a NAND gate 25. The output of the gate 25 carries a signal P and is connected via a signal inverter 26 to the other input of the gate 21. The output of the gate 21 forms the output of the error detector 16 which carries a signal F. Other embodiments of the error detector 16 comprising the logic circuits 20 to 26 are possible.

The operation of the error detector 16 will be seen from the following Table, taking into account the NAND logical functions: $1.1 = 0$ and $0.0 = 0.1 = 1$

TABLE

| VB2 | w | b | g | BV | Pw | Pb | P | F |
| --- | --- | --- | --- | --- | --- | --- | --- | --- |
| U<Ub | 0 | 1 | 1 | 1 | 1 | 1 | 0 | 0 |
| Ub U Uw | 1 |   |   | 0 | 1 | 0 | 1 | 1 |
| Ub<U<Uw | 1 | 1 | 0 | 1 | 0 | 1 | 1 | 1 |
|   |   |   |   | 0 | 1 | 0 | 1 | 1 |
| U> Uw | 1 | 0 | 1 | 1 | 0 | 1 | 1 | 1 |
|   |   |   |   | 0 | 1 | 1 | 0 | 0 |

The Table shows that when the signal value U in the signal VB2 lies below the threshold value Ub (i.e. black) the logical 1, which corresponds to white in the signal BV, gives a logical 0 in the signal F. This also applies when the signal value U in the signal VB2 lies above the threshold value Uw (i.e. white), in which case logical 0, which corresponds to black in the signal BV, occurs in the signal F. It is found that logical 0 in the signal F is the error indication.

When the signal value U in the signal VB2 is smaller than Ub (black) or greater than Uw (white) and the signal BV contains logical 0 (black) or logical 1 (white) respectively, the signal F contains logical 1, which means that there is no error. For the intermediate range, in which the signal value U in the signal VB2 lies between the threshold values Ub and Uw, no signal comparison takes place. The signal g in conjunction with logical 0 closes the gate 21 so that the signal F contains a logical 1.

It is found that the reference pattern 2 of FIG. 2 is used to perform a measurement on the narrow black pattern traces and the narrow blank pattern traces in the error detector 16 of FIG. 3 to determine whether the pattern 1 of FIG. 1 to be tested corresponds to the reference pattern. Such a measurement is not effected in those pattern traces of the reference pattern 2 of FIG. 2 which are shown shaded. AS a result, there are no critical problems with respect to accurate positioning and scanning of the patterns 1 and 2 in the pick-up devices 3 and 4.

In the circuit of FIG. 3 the signal F is applied to a store 27, an adder stage 28 and an output terminal 29. The video signal VBS1 from the pick-up device 3 is also supplied to the adder stage 28, and the output of this stage 28 is connected to a display device 30. The store 27 has a setting input to which, via a manually operable switch 31, a voltage which is set up at a terminal 32 and corresponds to logical (1) can be applied. The output of the store 27 is connected to an input of the gate 13 and to the input of a supply circuit 33 connected to a signal lamp 34. The output of the gate 13 is connected to inputs of the driving unit 9 and the control unit 5. In FIG. 3 the signal F is shown having a waveform which causes the store 27 to deliver a signal MF as shown.

The apparatus according to the invention operates as follows. A pattern 1 to be tested is placed in front of the pick-up device 3 by means of the drive unit 9 and the conveyor belt 8. When it is correctly positioned the drive unit 9 sends a corresponding signal to the control unit 5. The control unit 5 then supplies the control and synchronizing signals DS1 and DS2 to the pick-up devices 3 and 4 respectively which thereupon generate the video signals VBS1 and VBS2 respectively. Via the phase comparison circuit 10 the signal VBS1 is made to coincide with the signal VBS2, the circuit 11 being cut off. Upon coincidence of the signals VBS1 and VBS2 the circuit 11 is enabled. At the next scan of the patterns 1 and 2 in two television fields which together constitute an interlaced television picture, the signal measurement, i.e. the signal comparison, takes place in the error detector 16. If there is no error in the pattern 1, during the two field periods the signal F will always contain a logical 1, which is also present in the signal MF. At the end of the two field periods the pulse generator 12 supplies the pulse signal SV to the gate 13. The gate 13 is opened by the logical 1 in the signal MF so that the pulse containing logical 1 in the signal SV results in logical 0 at the output of the gate 13, which is an indication to the control unit 5 and the drive unit 9 that testing of the pattern 1 has been completed. The drive unit 9 then places another pattern 1 to be tested in front of the pick-up device 3, after which the cycle described repeats.

If, however, there is an error in the pattern 1 to be tested, in the said two field periods for testing a logical 0 occurs in the signal F, as is shown in FIG. 3. The logical 0 which occurs in the signal F at the instant, or location, of the error is the error indication. This error indication can be derived from the output terminal 29 to be utilized for rejecting the pattern 1. Rejection takes place, for example, in that the pattern 1 is removed from the belt 8 or is provided with a rejection mark. Furthermore, the error indication can be used when passing to the next pattern 1 to be tested.

The store 27, the display device 30 and the signal lamp 34 are used for performing visual inspection of a defective pattern 1. The error which occurs in the two test field periods and gives rise to a short-duration logical 0 in the signal F results, after storage in the store 27, in logical 0 in the signal MF. Consequently the gate 13 is closed so that the signal SV including the pulse at the end of the second test field period does not become available to drive unit 9 and the control unit 5. Instead of passing to the next pattern 1, the defective pattern 1 now is continuously being picked-up. The signalling lamp 34 draws attention thereto. The video signal VBS1 is displayed on the display device 30, while the signal F indicates the location of the defect in the picture of the pattern 1 displayed by a local signal attenuation or amplification, resulting in a dark or bright spot respectively. In the case of several defects several spots occur. The advantage of such visual inspection is that the locations at which the defects occur can immediately be determined so that measures can be taken with regard to the pattern manufacture. After the visual inspection the switch 31 can be closed for, for example, a minimum time of two field periods. As a result a logical 1 appears at the output of the store 27 irrespective of any defect in the signal F. Thus the gate 13 is opened during the said minimum time so that via the signal SV at the end of two field periods testing of the next pattern 1 will commence.

What is claimed is:

1. A method of testing a two-dimensional pattern by means of two synchronized pick-up devices, one for picking up the pattern to be tested and the other for picking up a reference pattern, which comprises, providing a reference pattern in the form of a modified pattern comprising at least three types of pattern traces having different brightness values with a first reference trace having a brightness value intermediate the brightness values of the second and third traces, the widths of the second and third reference pattern traces being narrower than the corresponding sections in the pattern to be tested, scanning the pattern to be tested and the reference pattern by means of said one and the other pick-up devices, respectively, to produce first and second signals corresponding to the respective patterns scanned, comparing said first and second signals to derive an error indication in the event of a given difference therebetween and in a manner such that only the second and third types of pattern traces in the reference pattern are used in the comparison operation.

2. Apparatus for inspecting a test object having a two-dimensional pattern by comparison thereof with a reference pattern comprising, first and second synchronized pick-up devices for scanning the test pattern and the reference pattern respectively, to derive first and second signals corresponding to the respective patterns scanned, said reference pattern comprising, first, second and third pattern traces having different brightness values with said first trace having a brightness value intermediate the brightness values of the second and third traces, the second and third traces being narrower in width than corresponding traces in the test pattern, an analog-to-binary converter, means coupling the input of the analog-to-binary converter to said first pick-up device, first and second threshold circuits coupled to said second pick-up device, one threshold circuit having a pass band for signals corresponding to low brightness values and the other having a pass band for signals corresponding to high brightness values, said pass bands overlapping in an intermediate band corresponding to signals having intermediate brightness values, and an error detector coupled to the outputs of said first and second threshold circuits and to the output of said analog-to-binary converter for effectively comparing said first and second signals by comparing the binary valued signals corresponding to the test pattern with the signals from said first and second threshold circuits which correspond to said second and third traces representing the extreme brightness values in the reference pattern.

3. Apparatus as claimed in claim 2, characterized in that the error detector output is connected to a storage device for storing the error indication.

4. Apparatus as claimed in claim 3, characterized in that for repeated pick-up the storage device is coupled to the pick-up device associated with the pattern to be tested, and means connecting the output of the first pick-up device and the output of the error detector to a display device.

5. Apparatus as claimed in claim 2 wherein said first and second threshold circuits derive third and fourth binary valued signals determined by said second signal.

6. Apparatus as claimed in claim 5 further comprising gating means coupled between the output of the second pick-up device and the inputs to the first and second threshold circuits, and phase comparison means having input means coupled to receive said first and second signals and an output coupled to control the operation of said gating means as a function of said first and second signals.

7. Apparatus as claimed in claim 6 wherein said first and second pick-up devices comprise first and second TV cameras producing first and second video signals, respectively, said means coupling the converter and first pick-up device comprises a third threshold circuit, and further comprising a control unit responsive to synchronizing pulses for synchronizing said first and second TV cameras.

8. Apparatus as claimed in claim 2 further comprising means for supplying threshold reference voltages $U_w$ and $U_B$ to said first and second threshold circuits, respectively, wherein $U_w$ is greater than $U_B$.

9. Apparatus as claimed in claim 8 wherein said error detector includes logic circuit means and said second and third reference traces produce a signal U at the inputs of the first and second threshold circuits, said second trace producing a signal $U < U_B$ and said third trace producing a signal $U > U_w$ and said threshold detectors produce binary signals determined thereby, said logic circuit means producing an output error signal when $U < U_B$ and the converter supplies a binary signal BV representing the brightest value of the test pattern trace and also produces an output error signal when $U > U_w$ and the converter supplies a binary signal BV representing the darkest value of the test pattern trace.

10. Apparatus as claimed in claim 9 wherein said logic circuit means produces an output signal indicating a correct matching of the test and reference patterns when $U < U_B$ and the signal BV represents the darkest value of the test pattern trace and also when $U > U_w$ and the signal BV represents the brightest value of the test pattern trace.

11. Apparatus as claimed in claim 10 wherein said first and second threshold detectors produce binary signals of the same binary value when $U_B < U < U_w$ and produce binary signals of opposite binary values when $U < U_B$ and $U > U_w$, and said logic circuit means produces and output signal indicating a correct matching of the test and reference patterns when $U_B < U < U_w$ in conjunction with either binary value of the converter signal BV.

* * * * *

UNITED STATES PATENT AND TRADEMARK OFFICE
CERTIFICATE OF CORRECTION

PATENT NO. : 4,006,296
DATED : February 1, 1977
INVENTOR(S) : CHRISTOPHER ERNEST PETERSON It is certified that error appears in the above-identified patent and that said Letters Patent are hereby corrected as shown below:

Column 2, line 15, after "continuous," insert --without--.

Signed and Sealed this

Tenth Day of May 1977

[SEAL]

Attest:

RUTH C. MASON
Attesting Officer

C. MARSHALL DANN
Commissioner of Patents and Trademarks